Nov. 11, 1969   D. W. BARTON   3,477,549
DUAL AUTOMOTIVE BRAKE SYSTEM
Filed June 4, 1968

INVENTOR.
DAVID W. BARTON
BY John R. Faulkner
Clifford L. Sadler
ATTORNEYS

United States Patent Office 3,477,549
Patented Nov. 11, 1969

3,477,549
DUAL AUTOMOTIVE BRAKE SYSTEM
David W. Barton, Birmingham, Mich., assignor to Ford Motor Company, Dearborn, Mich., a corporation of Delaware
Filed June 4, 1968, Ser. No. 734,329
Int. Cl. B60t 11/20, 11/24
U.S. Cl. 188—152                                    5 Claims

ABSTRACT OF THE DISCLOSURE

A disc brake construction for a dual automotive braking system having a caliper that straddles a brake rotor. A bore in the caliper contains a pair of pistons arranged in tandem fashion. Hydraulic pressure chambers are situated between the pistons and between the depth of the bore and the inner piston. Either or both of these chambers may be pressurized to move the outer piston against the brake lining and apply the brake.

Background of the invention

It has been recognized that a dual braking system for an automotive vehicle has certain advantages. In the currently conventional system, the brake master cylinder has first and second pressure chambers that are connected to the front and rear brakes, respectively. The front and rear portions of the system are mutually exclusive so that a hydraulic failure in one half will not affect the other half and it may be utilized to stop the vehicle. In the event of such a failure, however, only two of the four vehicle brakes are operable.

In view of the state of the art, it is the principal object of the present invention to provide a braking system of the redundant type in which four-wheel braking is possible even though there is a failure in a portion of the hydraulic system.

Brief summary of the invention

In the presently preferred embodiment of this invention, a disc brake is provided for a dual brake system having a rotor that rotates with the wheel and a caliper that straddles the rotor. In this preferred system, the caliper is of the floating type and has a single bore that contains a pair of pistons arranged in tandem fashion. The piston closest to the rotor is constructed to engage a brake lining. A pressure chamber is situated between the two pistons and is connected to one of the pressure chambers of a dual brake master cylinder. A second pressure chamber is situated between the depth of the caliper bore and the inner piston (the piston farthest from the rotor). The second chamber is connected to the other pressure chamber of the master cylinder. This construction provides a disc brake that may be actuated when pressure fluid is transmitted to either or both of the two caliper pressure chambers.

Brief description of the drawings

The many objects and advantages of the present invention will become amply apparent upon consideration of the following discussion and the accompanying drawings, in which.

Detailed description of the invention

Figure 1:
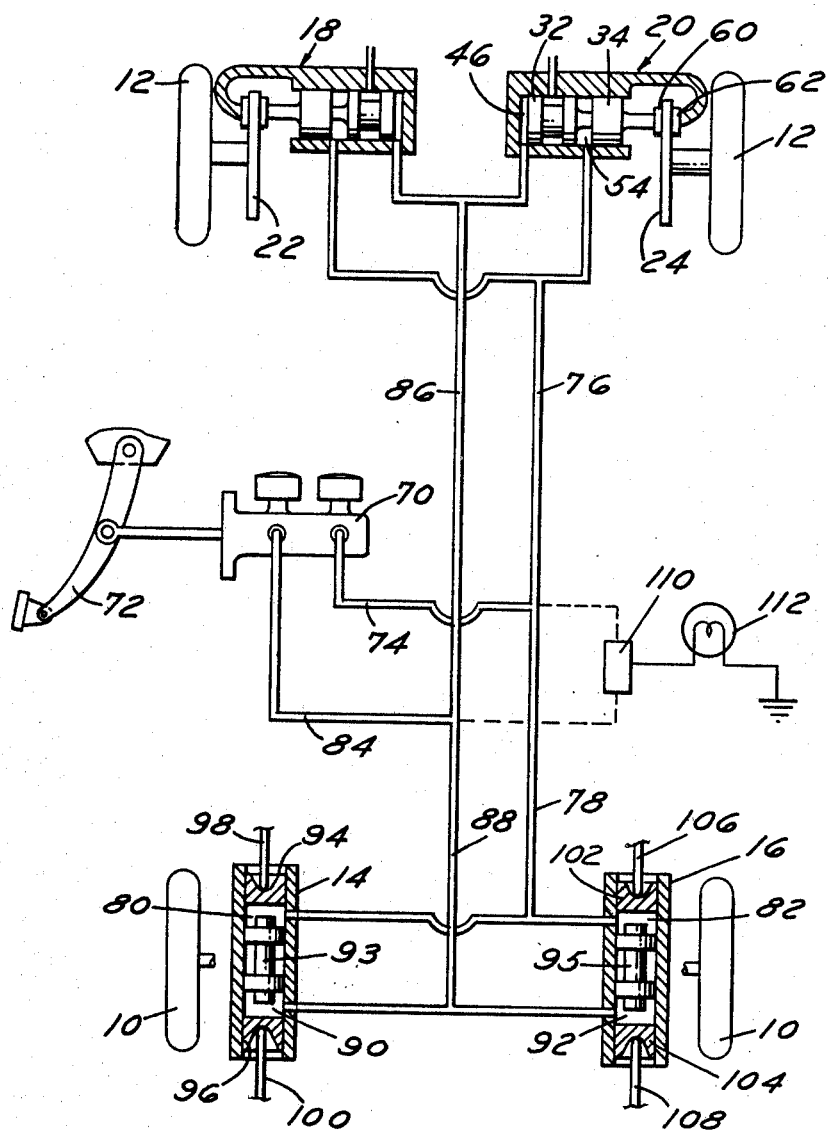
FIGURE 1 is a schematic plan view of an automotive brake system incorporating the present invention.

Referring now to the drawings for a detailed description of the invention, like reference numerals identify like parts throughout the various views. FIGURE 1 discloses a brake system for a vehicle having a pair of rear road wheels 10 and 11 and a pair of front road wheels 12 and 13. Drum and shoe type brakes are provided for the wheels 10 and 11. These brakes include left and right wheel cylinders 14 and 16. The wheel cylinders 14 and 16 are constructed to actuate the shoes against the brake drums.

At the front of the vehicle, left and right brake calipers 18 and 20 are shown. The brake calipers 18 and 20 straddle brake rotors 22 and 24 that are connected to the front wheels 12 and 13.

The caliper assembly 20 has a housing 26 with a leg portion 28 that extends along one radial side of the brake rotor 24. The housing 26 includes a bore 30 in which a pair of pistons 32 and 34 are slidably received. The pistons 32, 34 are arranged in tandem fashion within the bore 30. The inner piston 32 has spaced lands 36 and 38 that engage the wall of the bore 34. The lands 36, 38 are provided with rubber seals 40 and 42. A vent port 41 is positioned in the housing 26 in communication with the annular space 43 between the lands 40 and 42. A porous dirt seal 45 covers the vent port 41.

Inner piston 32 is recessed as indicated at 44 so as to form a pressure chamber 46 with the end wall 48 of the bore. A port 50 is constructed in the wall of the caliper housing 26 to permit chamber 46 to be connected to a pressure source.

A cylindrical portion 52 extends forwardly from the piston 32 and engages the backside of the piston 34. A pressure chamber 54 is situated between the pistons 32 and 34. Ports 56 are provided in the wall of the cylindrical portion 52 so that the space enclosed by that portion is maintained at the same pressure as and forms a part of the pressure chamber 54. A port 58 in the housing 26 permits the chamber 54 to be connected to a pressure source.

Brake linings 60 and 62 are situated on either side of the brake rotor 24. Leg 28 of the housing 26 engages the brake lining 62. An insulator member 66 is positioned against the other brake lining 60. The piston 36 engages the backside of the insulator 66. A rubber boot seal 68 is interposed between the housing 26 and the insulator 66 at the entrance to the bore 24.

Referring back to FIGURE 1, a dual master cylinder 70 having mutually independent pressure chambers is provided. The master cylinder 70 is adapted to be actuated by a brake pedal 72. A brake line 74 is connected to one of the pressure chambers within the master cylinder 70. The brake line 74 splits with a line portion 76 extending forwardly and a line portion 78 extending rearwardly. Line portion 76 branches with one branch being connected to the chamber 54 of the caliper 20 and the other branch being connected to the corresponding chamber of caliper 18. The rear brake line 78 also branches with branches being connected to chambers 80 and 82 of the wheel cylinders 14 and 16, respectively.

Line 84 is connected to the second pressure chamber of the brake master cylinder 70 and has forwardly and rearwardly extending brake line portions 86 and 88. The forwardly extending line 86 is connected to chamber 46 of the right caliper 20 and to the comparable chamber of the left caliper 18. Line 88 going to the rear brakes is divided and is constructed to deliver pressure fluid to chambers 90 and 92 of the wheel cylinders 14 and 16, respectively. In wheel cylinder 14, floating piston 93 separates chambers 80 and 90. Similarly, floating piston 95 is situated between chambers 82 and 92.

In FIGURE 1, the construction of the rear brakes is shown schematically. The left wheel cylinders 14 has pistons 94 and 96 that are connected by struts 98 and 100 to conventional brake shoe assemblies. Similarly, piston 102 and piston 104 situated in wheel cylinder 16 are connected by struts 106 and 108 to brake shoe assemblies.

A pressure differential sensing device 110 is connected between first and second brake lines 74 and 84. This device senses any pressure differential in the system resulting from a hydraulic failure. When such a failure occurs, the device 110 operates a warning light 112.

Operation

Figure 2:
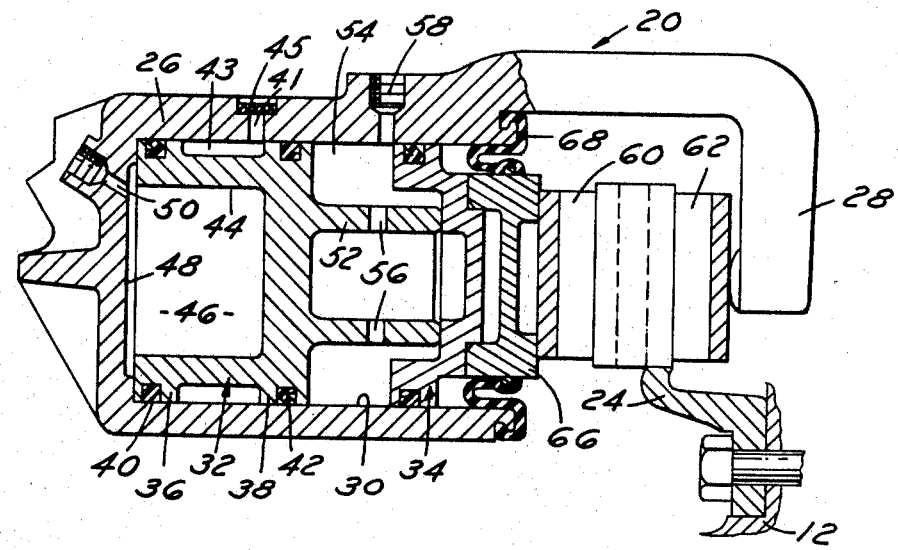
FIGURE 2 is an elevational view in section disclosing the construction of a brake caliper portion of a disc brake for use in the brake system of FIGURE 1.

The dual master cylinder 70 is of conventional construction and delivers hydraulic fluid of equal pressure to the lines 74 and 84 when the brake pedal 72 is depressed. Actuation of the brake pedal 72 causes a flow of pressurized fluid to the chambers 46 and 54 of the brake caliper assembly 20. The piston 32 "floats" between these two chambers and thus, the pressure in the two chambers 46, 54 is equalized. When the chambers 46, 54 are pressurized piston 34 will move to the right as seen in FIGURE 2 and, acting through the insulator 66, will cause the brake lining 60 to bear against the brake rotor 24. When equal pressure is applied to the chambers 46 and 54, the piston 34 will move to the right as seen in FIGURE 2 in an amount equal to twice the right-hand displacement of the piston 32.

The member 66 interposed between the brake lining 60 and the piston 34 functions as an insulator and serves to prevent the transmission of heat created during the braking operation from being transmitted from the brake lining 60 to the piston 34. Transmission of heat to the piston 34 could cause the fluid in chamber 54 to overheat and boil. This would obviously adversely affect brake operation.

The caliper housing 26 is movably connected to the chassis of the vehicle so that as the piston 34 moves to the right to cause the brake lining 60 to engage the rotor 24, the housing 26 will move to the left and leg portion 28 will force the lining 62 into engagement with the opposite side of the rotor 24. Thus, pressurization of chambers 46 and 54 causes the linings 60 and 62 to trap or pinch the rotor 24 and thereby retard its rotation.

The rear brakes operate in the following fashion. When hydraulic pressure is applied in equal amounts through the brake lines 78 and 88 to the chambers 80 and 90 of the wheel cylinder 14, the pistons 94 and 96 will be moved outwardly to force the brake shoes into engagement with the brake drum. The right rear brake operates in a similar manner.

In the event a failure should occur anywhere in the brake system, four-wheel braking capability is still present. By way of illustration, if the failure should occur in line 74 or in one of its portions 76 or 78, the device 110 will sense a differential in pressure when the brake pedal 72 is applied. This would activate the signal light 112. Such a failure would prevent a creation of hydraulic pressure in the chamber 54 of caliper assembly 20. It would still be possible, however, to build up hydraulic pressure in chamber 46 behind inner piston 32. This pressure would cause the piston 32 to move to the right and, acting through piston 34 and insulator 66, the lining 60 would be brought into engagement with the rotor 24. A similar operation takes place at caliper assembly 18.

At the rear brakes, hydraulic pressure will not be created in the chamber 80 and 82 of wheel cylinders 14 and 16, respectively. Chambers 90 and 92 will be pressurized and the floating pistons 93 and 95 will be displaced against the pistons 94 and 102. A further increase in pressure in chambers 90, 92 will cause the pistons 96, 94 to move outwardly in wheel cylinder 14 and pistons 102 and 104 to move outwardly in wheel cylinder 16. This movement of the pistons in the wheel cylinders 14 and 16 will actuate the brakes in a reasonably conventional fashion.

If the hydraulic failure should occur in line 84, there will be an absence of pressure in chamber 46 of caliper assembly 20 and pressure will be created in chamber 54. Under these circumstances, the piston 32 will remain in the position illustrated in FIGURE 2 and the piston 34 will move to the right and actuate the brake in the normal fashion by bringing linings 60, 62 into engagement with the rotor 24.

The operation of the rear brakes will be substantially identical to their operation when the failure was in line 74. With line 74 pressurized, chambers 80 and 82 will also be pressurized. The floating pistons 90, 93 will move against the pistons 96, 104 and the brake shoes will expand against the drums.

With a failure in the brake line 84, the warning device 110 will again be actuated and the light 112 will be turned on.

Thus, it is seen that regardless of the location of the hydraulic failure, the double pressure chamber construction of the brake assemblies of this invention will provide a redundant system having four-wheel breaking capability.

Referring to FIGURE 2, if a failure should occur at the seal 40 or the seal 42 fluid would leak into the annular space 43 and weep out of the port 41. Hydraulic fluid would then appear on the outside of the caliper housing 26 which would indicate to a mechanic upon visual inspection that there had been a failure of one of the internal seals.

Alternate embodiment

Figure 3:
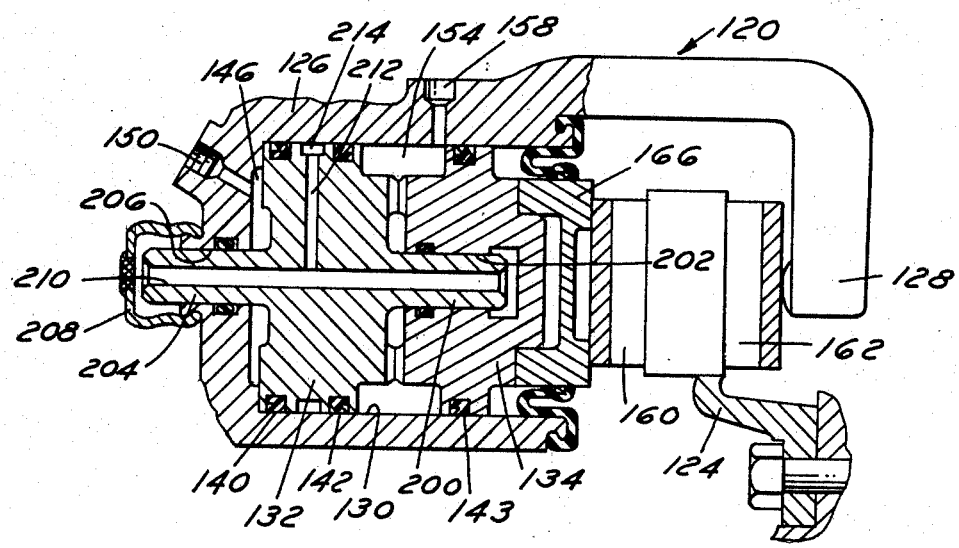
FIGURE 3 is an elevational view partly in section of an alternate construction of the brake caliper of FIGURE 2.

An alternate embodiment of the invention is illustrated in FIGURE 3. In this embodiment, the caliper 120 has a housing 126 with a bore 130 to slidably receive inner and outer pistons 132 and 134. Piston 132 has a pair of spaced seals 140 and 142 in sliding engagement with the wall of the bore 130. Piston 134 also has a seal 143 in sliding engagement with the bore 130. A pressure chamber 154 is situated between the pistons 132 and 134 and receives pressurized hydraulic fluid through a port 158. A port 150 leads to the chamber 146 situated behind the inner piston 132 and forms a means for connecting it to a brake master cylinder.

The caliper housing 126 has a leg portion 128 that is constructed to engage a brake lining 162 positioned adjacent to a brake rotor 124. A second brake lining 160 is positioned on the other side of the rotor 124 and is engaged by an insulator 166. When hydraulic pressure is introduced into the chambers 146 and 154, the piston 134 will move to the right against the insulator 166 and force the lining 160 into engagement with the rotor 124. The caliper housing 126 is movably connected to vehicle chassis structure so that it will move to the left when the chambers 146, 155 are pressurized. Leg 128 of the housing 126 will be forced against the lining 162 and it, in turn, will rub against the rotating rotor 124.

If a hydraulic failure should prevent the pressurization of chamber 146, then hydraulic pressure in chamber 154 will be sufficient to move the piston 134 to the right and cause a brake application. Similarly, pressurization of chamber 146 would be sufficient, in the absence of pressure in chamber 154, to move both pistons 132 and 134 to the right and cause a brake application.

The piston 132 has an outer tubular extension 200 that fits within a central bore 202 of the piston 134. Similarly, a tubular extension 204 extends to the left from the piston 132 and passes through a sealed opening 206 in the housing 126. The end of the tubular extension 204 is covered by a vented cap 208. An axially extending hole 210 is drilled through the tubular extensions 200 and 204. A radial hole 212 connects passage 210 with the annular space 214 situated between the seals 140 and 142.

The seals 140 and 142 serve to separate the pressure chambers 146 and 154 of the two halves of the split brake system. If one of these seals should fail, then hydraulic fluid would collect in the annular space 214 and pass through the passages 212 and 210. This fluid would seep out of the vented cap 208. An inspection by a mechanic would disclose the collection of hydraulic fluid on the external surface of the brake housing 126 and would instantly indicate the failure of one of the internal seals of the brake assembly 120.

The foregoing description presents the presently preferred embodiments of this invention. Modifications and alterations may occur to those skilled in the art that will come within the scope and spirit of the invention.

I claim:

1. A brake for a dual automotive brake system comprising a housing, a bore in said housing, first and second coaxially aligned pistons slidably received in said bore, a first pressure chamber situated between said pistons, a second pressure chamber situated between the inner end of said bore and said first piston, means constructed to convey hydraulic pressure fluid to said chambers, said second piston being constructed to move a brake lining member against a rotating brake member in response to hydraulic pressure in said first chamber, said first piston being constructed to engage said second piston and to move said second piston and said brake lining member in response to a greater hydraulic pressure in said second chamber than in said first chamber, one of said pistons having a pair of spaced apart fluid seals slidably engaging the wall of said bore, an annular chamber between said seals, vent means communicating with said annular chamber and constructed to convey any hydraulic fluid leaking past either of said seals to the exterior of said housing, one of said seals being disposed adjacent one of said pressure chambers and the other of said seals being disposed adjacent the other of said pressure chambers.

2. A brake according to claim 1 and including:
said rotating member comprising a rotating brake disc, said housing comprising a caliper straddling said disc.

3. A brake according to claim 1 and including:
said first piston having a cup-shape interior recess forming a part of said second chamber and having a cylindrical extension engaging said second piston.

4. A brake according to claim 1 and including:
said rotating member comprising a rotating brake disc, said housing comprising a caliper straddling said disc, said first piston having a cup-shape interior recess forming a part of said second chamber, said first piston having a cylindrical extension engaging said second piston.

5. A brake for a dual automotive brake system comprising a housing, a bore in said housing, first and second coaxially aligned pistons slidably received in said bore, a first pressure chamber situated between said pistons, a second pressure chamber situated between the inner end of said bore and said first piston, means constructed to convey hydraulic pressure fluid to said chambers, said second piston being constructed to move a brake lining member against a rotating brake member in response to hydraulic pressure in said first chamber, said first piston being constructed to engage said second piston and to move said second piston and said brake lining member in response to a greater hydraulic pressure in said second chamber than in said first chamber, one of said pistons having a pair of spaced apart fluid seals engaging the wall of said bore, an annular recess formed in the surface of said one piston between said seals, vent means communicating with said recess and constructed to convey any hydraulic fluid leaking past said seals to the exterior of said housing, said vent means comprising internal passage means in said one piston, said one piston having an extension portion protruding from said bore, said internal passage means being disposed in said extension portion.

References Cited

UNITED STATES PATENTS

| 2,497,438 | 2/1950 | Butler. |
| 3,097,018 | 7/1963 | Stelzer. |
| 3,232,057 | 2/1966 | Kersting. |

GEORGE E. A. HALVOSA, Primary Examiner

U.S. Cl. X.R.

92—62, 65; 188—106